United States Patent
Csonka

(10) Patent No.: US 10,732,586 B2
(45) Date of Patent: Aug. 4, 2020

(54) ACTIVE DISTURBANCE COMPENSATION FOR PHYSICALLY CHANGING SYSTEMS

(71) Applicant: X Development LLC, Mountain View, CA (US)

(72) Inventor: Paul Csonka, Redwood City, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 2 days.

(21) Appl. No.: 15/647,781

(22) Filed: Jul. 12, 2017

(65) Prior Publication Data
US 2019/0018373 A1 Jan. 17, 2019

(51) Int. Cl.
*G05B 13/04* (2006.01)
*G05B 21/02* (2006.01)
*G05B 19/042* (2006.01)
*G05B 23/02* (2006.01)
*G05B 5/01* (2006.01)

(52) U.S. Cl.
CPC ....... *G05B 13/042* (2013.01); *G05B 19/0421* (2013.01); *G05B 19/0428* (2013.01); *G05B 21/02* (2013.01); *G05B 23/0294* (2013.01); *G05B 5/01* (2013.01)

(58) Field of Classification Search
None
See application file for complete search history.

(56) References Cited

U.S. PATENT DOCUMENTS

| | | | |
|---|---|---|---|
| 4,500,823 A * | 2/1985 | Walrath | G05D 3/1445 318/561 |
| 5,754,023 A | 5/1998 | Roston et al. | |
| 6,593,719 B2 | 7/2003 | Satta et al. | |
| 7,437,237 B2 | 10/2008 | Murakado | |
| 7,561,141 B2 | 7/2009 | Shahoian et al. | |
| 9,651,399 B2 | 5/2017 | Stewart et al. | |
| 2005/0033500 A1 | 2/2005 | Moss | |

(Continued)

FOREIGN PATENT DOCUMENTS

KR 101129255 B1 3/2012

OTHER PUBLICATIONS

International Search Report and Written Opinion for Application No. PCT/US2018/039504, dated Oct. 8, 2018. 13 pages.

*Primary Examiner* — Mohammad Ali
*Assistant Examiner* — Vincent W Chang
(74) *Attorney, Agent, or Firm* — Botos Churchill IP Law LLP

(57) ABSTRACT

Aspects of the disclosure provide for a controller of a system. The controller is configured to apply a drive to transition the system from a first state to a second state and to continually adjust the drive in response to a detected disturbance quantity in real-time by performing a loop until the system is in the second state. The loop comprises determining a predicted state of the system at a given instance based on the obtained current state of the system and the applied drive, obtaining the current state of the system at the given instance using one or more sensors, determining a disturbance quantity amount based on a difference between the predicted state at the given instance and an actual state of the system at the given instance, determining an adjustment to the drive based on the disturbance quantity amount, and applying the adjusted drive to the system.

19 Claims, 5 Drawing Sheets

(56) References Cited

U.S. PATENT DOCUMENTS

| | | | |
|---|---|---|---|
| 2008/0035797 A1* | 2/2008 | Defendini | B64G 1/244 244/165 |
| 2010/0250031 A1* | 9/2010 | Paschall, II | G01C 21/24 701/8 |
| 2016/0139584 A1* | 5/2016 | Caseley | F41H 11/02 318/569 |
| 2016/0324447 A1 | 11/2016 | Hallberg | |
| 2017/0199470 A1* | 7/2017 | Westerlaken | G03F 7/70858 |
| 2017/0231114 A1* | 8/2017 | Butscher | H05K 7/20218 |
| 2018/0146126 A1* | 5/2018 | Tian | G03B 17/561 |

* cited by examiner

300

ACTIVE DISTURBANCE COMPENSATION FOR PHYSICALLY CHANGING SYSTEMS

BACKGROUND

Systems may have physically varying mechanisms that may operate differently over time. For example, systems may be cycled through large temperature ranges and experience significantly varying plant (mechanism) characteristics. Mechanisms may wear with use, which may change friction and viscosity characteristics, for example. Mechanisms may also have components that reduce performance using traditional controls techniques. In these situations, it may be difficult for a user to compensate for the variability in the system for reliable operation.

BRIEF SUMMARY

Aspects of the disclosure provide for a controller of a system. The controller includes one or more processors in communication with one or more sensors. The one or more processors are configured to receive instructions to move the system from a first state to a second state and obtain a current state of the system from the one or more sensors. The one or more processors are also configured to apply a drive to transition the system from the first state to the second state and continually adjust the drive in response to a detected disturbance quantity in real-time by performing a loop until the system is in the second state. The loop performed by the one or more processors includes (i) determining a predicted state of the system at a given instance based on the obtained current state of the system and the applied drive, (ii) obtaining the current state of the system at the given instance using the one or more sensors, (iii) determining a disturbance quantity amount based on a difference between the predicted state at the given instance and an actual state of the system at the given instance, (iv) determining an adjustment to the drive based on the disturbance quantity amount, and (v) applying the adjusted drive to the system.

In one embodiment, the system is a communication system comprising a pointing hardware. Also in this embodiment, the first state is a first position of the pointing hardware, and the second state is a second position of the pointing hardware different from the first position. Alternatively, the system is a communication system comprising a temperature regulator. In this alternate embodiment, the first state is a first temperature of the communication system, and the second state is a second temperature of the communication system different from the first temperature.

The one or more processors are optionally also configured to determine the predicted state based on a model of the system. The model is determined based on the current state of the system, known system parameters, and known changes to system parameters under certain conditions. In this embodiment, the model is also determined based on environmental conditions.

Other aspects of the disclosure provide for a system. The system includes one or more processors in communication with one or more sensors. The one or more sensors of the system are configured to detect the state of a communication system. In addition, the one or more processors are configured to receive instructions to move the communication system from a first state to a second state and to obtain a current state of the system from the one or more sensors. The one or more processors are also configured to apply a drive to transition the communication system from the first state to the second state and continually adjust the drive in response to a detected disturbance quantity in real-time by performing a loop until the system is in the second state. The loop includes (i) determining a predicted state of the system at a given instance based on the obtained current state of the system and the applied drive, (ii) obtaining the current state of the system at the given instance using the one or more sensors, (iii) determining a disturbance quantity amount based on a difference between the predicted state at the given instance and an actual state of the system at the given instance, (iv) determining an adjustment to the drive based on the disturbance quantity amount, (v) and applying the adjusted drive to the communication system.

In one embodiment, the system also includes the communication system. In another embodiment, the system includes the one or more sensors. The one or more sensors optionally include a thermometer configured to measure the current temperature of the communication system. In this embodiment, the system additionally includes a temperature regulator, and the first state is a first temperature of the communication system, and the second state is a second temperature of the communication system different from the first temperature. Alternatively, the one or more sensors of the system include an inertial measurement unit.

The system additionally or alternatively includes a pointing hardware. In this embodiment, the first state is a first position of the pointing hardware, and the second state is a second position of the pointing hardware different from the first position. In a further embodiment, the one or more processors are configured to generate a model of the communication system based on the current state of the communication system, known system parameters of the communication system, and known changes to system parameters under certain conditions and determine the predicted state based on the model of the communication system. In this embodiment, the model of the communication system is optionally also generated based on environmental conditions.

Further aspects of the disclosure provide for a method. The method includes receiving, by one or more processors, instructions to move a system from a first state to a second state; obtaining, by the one or more processors, a current state of the system from one or more sensors; applying, by the one or more processors, a drive to transition the system from the first state to the second state; and continually adjusting, by the one or more processors, the drive in response to a detected disturbance quantity in real-time by performing a loop until the system is in the second state. The loop includes (i) determining a predicted state of the system at a given instance based on the obtained current state of the system and the applied drive, (ii) obtaining the current state of the system at the given instance using the one or more sensors, (iii) determining a disturbance quantity amount based on a difference between the predicted state at the given instance and an actual state of the system at the given instance, (iv) determining an adjustment to the drive based on the disturbance quantity amount, and (v) applying the adjusted drive to the system.

In one embodiment, the system is a communication system including a pointing hardware. The first state is then a first position of the pointing hardware, and the second state is a second position of the pointing hardware different from the first position. In an alternative embodiment, the system is a communication system including a temperature regulator. The first state is then a first temperature of the communication system, and the second state is a second temperature of the communication system different from the first temperature. Additionally or alternatively, the method also includes generating a model of the system based on the current state of the system, known system parameters, and known changes to system parameters under certain conditions. Determining the predicted state in this embodiment is also based on the model of the system.

DETAILED DESCRIPTION

Overview

The technology is related to a system controller configured to move a system while actively compensating for physical variations in the system. The system controller may be configured to transition the system from a first state to a second state. Physical variations of the system may include, for example, change in viscosity or change in friction force of a rotational axis due to temperature fluctuations, physical deformation, or normal lifetime wear and tear of components.

The system controller may be configured to transition the system from a first state to a second state by applying drive to the system and comparing an actual state of the system with a predicted state of the system as the drive is being applied. The drive may be adjusted in real-time in response to the difference between the actual state and the predicted state. Detected system and/or environmental conditions may be used to determine the predicted state of the system. In this way, the system controller may control variability and uncertainty detected in essentially real-time. The drive may be continually updated until the system reaches the second state. In this way, the system may transition smoothly and accurately from the first state to the second state.

Example Systems

Figure 1:
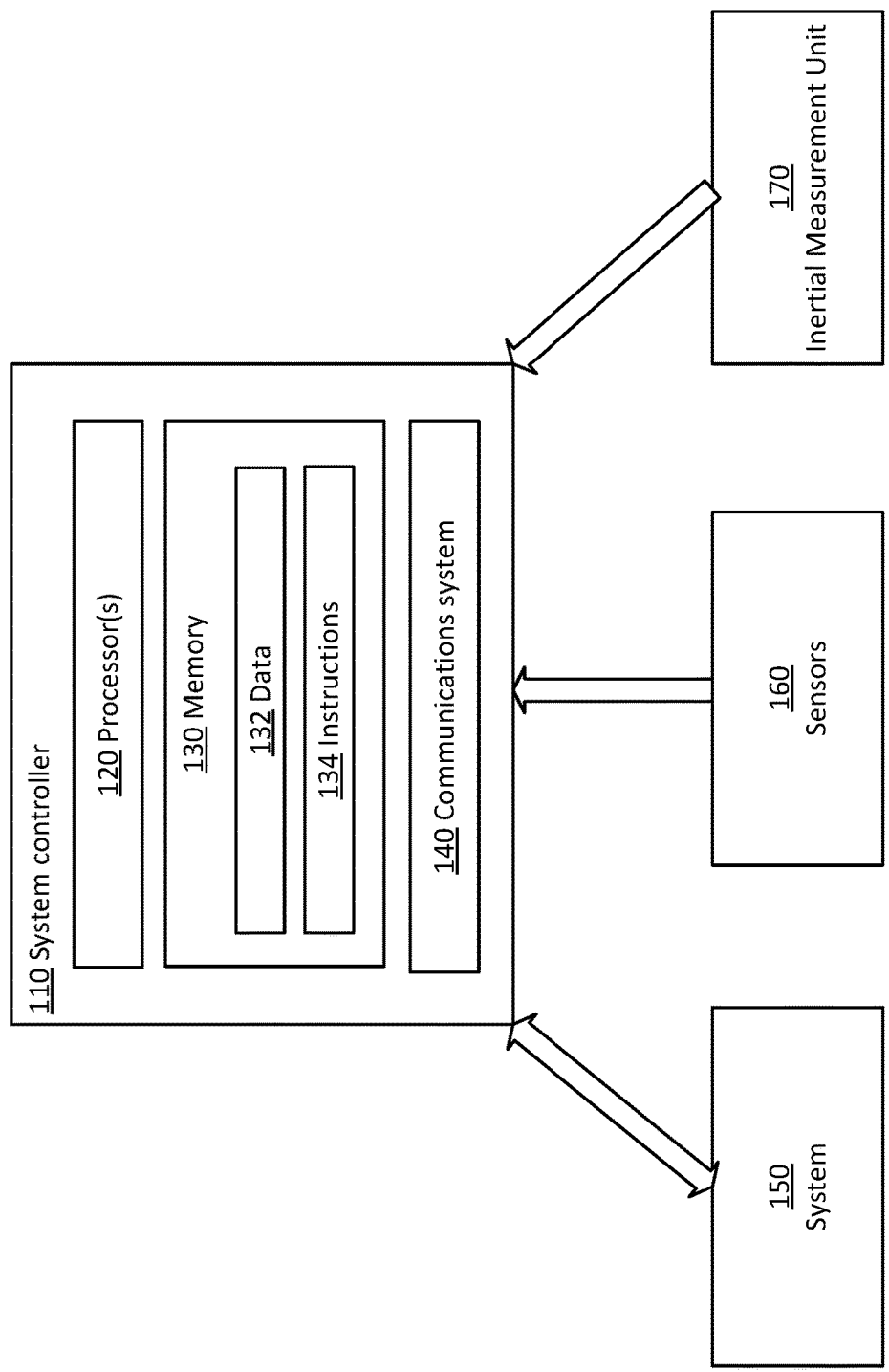
FIG. 1 is a functional diagram of an overall system 100 in accordance with aspects of the disclosure.

FIG. 1 shows an overall system 100 that includes a system controller 110, a system 150, and one or more sensors 160. The system controller 110 may be a computer having one or more processors 120, a memory 130, and a communications system 140. For example, the system controller 110 may include server computers operating as a load-balanced server farm, distributed system, etc. Yet further, although some functions described below are indicated as taking place on a single computer having a single processor, various aspects of the subject matter described herein can be implemented by a plurality of computers, for example, communicating information over a wired and/or wireless network. Additionally, the system controller may be in communication with system 150, the one or more sensors 160, and the inertial measurement unit 170.

The one or more processors 120 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 120 and memory 130 as being within the same block, it will be understood that the one or more processors 120 and memory 130 may actually comprise multiple processors and memories that may or may not be stored within the same physical housing. Accordingly, references to a processor or computer will be understood to include references to a collection of processors or computers or memories that may or may not operate in parallel.

Memory 130 stores information accessible by the one or more processors 120, including data 132 and instructions 134 that may be executed by the one or more processors 120. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the instructions and data are stored on different types of media.

Data 132 may be retrieved, stored or modified by the one or more processors 120 in accordance with the instructions 134. For instance, although the system and method is not limited by any particular data structure, the data 132 may be stored in computer registers, in a relational database as a table having a plurality of different fields and records, XML documents or flat files. The data 132 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 132 may comprise any information sufficient to identify the relevant information, such as numbers, descriptive text, proprietary codes, references to data stored in other areas of the same memory or different memories (including other network locations) or information that is used by a function to calculate the relevant data.

Instructions 134 may be any set of instructions to be executed directly (such as machine code) or indirectly (such as scripts) by the one or more processors 120. For example, the instructions 134 may be stored as computer code on the computer-readable medium. In that regard, the terms "instructions" and "programs" may be used interchangeably herein. The instructions 134 may be stored in object code format for direct processing by the one or more processors 120, or in any other computer language including scripts or collections of independent source code modules that are interpreted on demand or compiled in advance. Functions, methods and routines of the instructions 134 are explained in more detail below.

Communications system 140 may be configured to communicate with system 150, the one or more sensors 160, and the inertial measurement unit 170. The communication system 140 may include a receiver configured to receive information as well as a transmitter configured to transmit signals to system 150 on one or more links. The one or more links may be formed via optical fiber, radio frequencies, optical frequencies, cable, or other communication means. The communications system 140 may also be configured to transmit a signal to the one or more sensors 160 and the inertial measurement unit 170 using a same or different transmitter as used to transmit signals to system 150. While the system controller 110 is depicted in FIG. 1 as being remote from the system, in some implementations, the system controller 110 may be a part of system 150.

Figure 2:
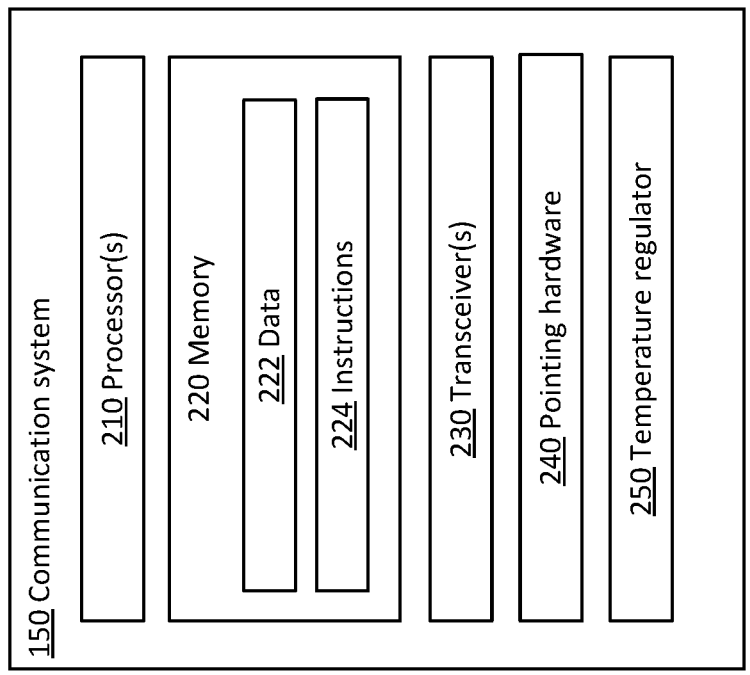
FIG. 2 is a functional diagram of a communication system 150 in accordance with aspects of the disclosure.

In some embodiments, system 150 may be a communication system 150 as shown in FIG. 2 capable of physically changing, such as, for example, by changing location, changing direction, or changing temperature. The communication system 150 may include one or more processors 210, a memory 220, one or more transceivers 230, a pointing hardware 240, and a temperature regulator 250. The one or more processors 210 may be any well-known processor or a dedicated controller similar to the one or more processors 120 described above. Memory 220 may store information accessible by the one or more processors 210, including data 222 and instructions 224 that may be executed by processor 210. Memory 220, data 222, and instructions 224 may be configured similarly to memory 130, data 132, and instructions 134 described above.

The one or more transceivers 230 may be configured to communicate with one or more other communication systems. The one or more transceivers 230 may be configured to transmit and receive radio frequencies and/or optical frequencies via cable, fiber, or free space. A plurality of communication systems, including communication system 150 may form a communication network. Pointing hardware 240 may include a gimbal configured to adjust a direction of the one or more transceivers 230. The pointing hardware 240 may be configured to move in at least two degrees of freedom, such as, for example, yaw and pitch. The adjustments to the direction of the one or more transceivers 230 may be made to establish acquisition and connection links between the communication system 150 and another communication system. Temperature regulator 250 may be configured to adjust a temperature of the system. In some embodiments, the temperature regulator 250 may comprise a heater configured to warm one or more components of the system.

Returning to FIG. 1, the one or more sensors 160, or estimators, may be configured to monitor a state of system 150 and transmit the state of the system to the system controller 110. The one or more sensors may include encoders, accelerometers, or gyroscopes and may include one or more sensors configured to measure one or more of system location, pose, angle, velocity, torques, as well as other forces. In some embodiments, the one or more sensors 160 may include the inertial measurement unit 170. In addition, the one or more sensors 160 may include one or more sensors configured to measure one or more environmental conditions such as, for example, temperature, wind, radiation, precipitation, humidity, etc. In this regard, the one or more sensors may include thermometers, barometers, hygrometers, etc. While the one or more sensors 160 are depicted in FIG. 1 as being separate and remote from the system 150, in some implementations, some or all of the one or more sensors 160 may be part of or rather incorporated into system 150.

Example Methods

Figure 3:
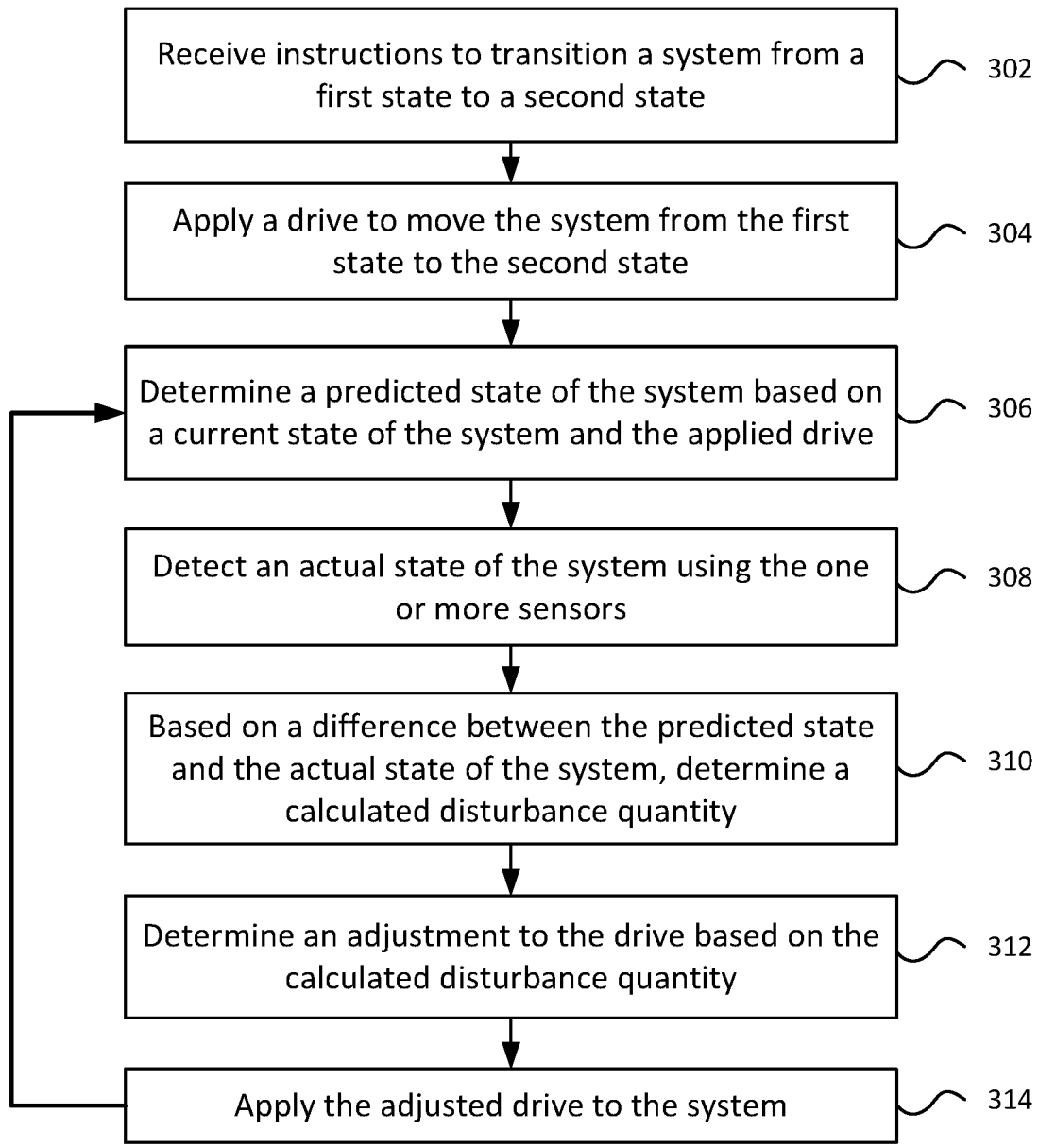
FIG. 3 is a flow diagram 300 of a method in accordance with aspects of the disclosure.

FIG. 3 shows a flow diagram 300 in accordance with some aspects herein that may be performed by the one or more processors 120 of the system controller 110. While FIG. 3 shows blocks in a particular order, the order may be varied and multiple operations may be performed simultaneously. Also, operations may be added or omitted.

At block 302, the one or more processors 120 may receive instructions to transition the system 150 from a first (or current) state to a second state. The instructions may be received from system 150 or from a central control system. In some embodiments, the transition may be between two positions or directions. For example, for communication system 150, the instructions may be to move pointing hardware 240 from a first position to a second position. The first position may be a current position of the pointing hardware 240, and the second position may be one radian from the first position.

In other embodiments, the transition may be between a current temperature and a target temperature. For example, for communication system 150, the instructions may be to warm the system 150 (or increase the temperature of the system) using temperature regulator 250 from the current temperature to the target temperature. As an example, the target temperature may be one degree Fahrenheit higher than the current temperature of the system 150. In further embodiments, this may be generalized to other states in the system known to be varying, such as, for example, pressure, air flow, light intensity, angle, velocity, or acceleration.

At block 304, the one or more processors 120 may apply a drive on the system 150 to move the system 150 towards the second state. For example, the applied drive may move the pointing hardware 240 towards the second position or may control the temperature regulator 250 to heat the system 150 to reach the higher target temperature.

At block 306, as drive is applied to the system, the one or more processors 120 may determine a predicted state of the system 150 at a given point in time based on a current state of the system, a model of the system, and the applied drive. The current state of the system 150 may be determined based on measurements of one or more system parameters received at a sensor compensation layer of the system controller 110 from the one or more sensors 160. The model of the system may be based on the current state of the system, known system parameters, and known changes to system parameters under certain conditions. The model of the system may also be based on environmental conditions provided by the one or more sensors 160. If one or more system parameters is known to vary when a condition changes, the model may be adjusted based on any detected changes in the condition. For example, it may be known that temperature affects friction in a bearing of the pointing hardware 240 in a predictable way, e.g., friction increases with lower temperature. Another example is that it may be known that over time, friction in the bearing has a predictable pattern of increases and decreases due to wear.

Returning to the example, the pointing hardware 240, the predicted position at the given point in time may be 0.5 radian from the first position, or halfway between the first position and the second position. For the temperature regulator 250, the predicted temperature at the given point in time may be half a degree Fahrenheit, or halfway between the current temperature and the target temperature.

At block 308, the one or more processors 120 may detect an actual state of the system from the sensors at the given point in time. For the pointing hardware 240, the actual position at the given point in time may be 0.25 radians from the first position, or 0.25 radians short of the predicted position, 0.5 radians. For the temperature regulator 250, the actual temperature at the given point in time may be 0.75 degrees Fahrenheit higher, or 0.25 degrees higher than the predicted temperature, 0.5 degrees Fahrenheit. In an ideal system, the actual state of the system would match the predicted state. When unaccounted disturbances exist in the system or the environment, the actual state of the system would not match the predicted state.

At block 310, the one or more processors 120 may determine a disturbance value or quantity based on a difference between the predicted state and the detected actual state of the system. The disturbance quantity may be the difference between the predicted state and the detected actual state of the system, a percentage calculated using the difference, a ratio using the difference, or other value using the difference as a variable. The disturbance quantity may be greater when the difference is greater and smaller when the difference is smaller. As described in block 308, the difference in the predicted and actual location of the pointing hardware 240 is −0.25 radians, and the difference in the predicted and actual temperature of the system is +0.25 degrees Fahrenheit. The disturbance quantities may be −0.25 and +0.25, respectively.

At block 312, the one or more processors 120 may determine an adjustment to the drive based on the disturbance quantity. If the actual state falls short of the predicted state, the drive may be increased to compensate for the shortcoming. For example, because the actual position of the pointing hardware 240 at the given point in time falls 0.25 radians short of the predicted 0.5 radians, the drive for moving the pointing hardware may be increased. If the actual state exceeds the predicted state, the drive may be decreased to compensate for the overshot. For example, because the actual temperature of the system 150 has gone 0.25 degrees Fahrenheit above the predicted temperature at the given point in time, the drive to the temperature regulator 250 may be decreased to slow the warming of the system 150. Adjustments to the drive may also be changes in direction, such as, for example, a reverse drive if the pointing hardware overshoots the intended 1 radian change in position.

In some instances, it is possible that the adjustment to the drive results in zero drive. For example, the drive may be adjusted to zero when it is determined that the system is transitioning to the second state too quickly and that removing the drive may slow the transition to a desirable rate. In some systems, the drive may be adjusted to zero when it is determined that the system is in the second state.

It is also possible for the determined adjustment to the drive to be zero, and therefore for the adjusted drive to be the same as the currently applied drive. When the predicted state of the system matches the actual state of the system, and the difference is therefore nothing (i.e., zero), the adjustment may also be determined to be nothing.

At block 314, the one or more processors 120 may apply the adjusted drive to the system. In some embodiments, the drive for more than one mechanism, such as the pointing hardware 240 and the temperature regulator 250, may be applied at the same time, and may be calculated and adjusted through other control methods. In these embodiments, the total drive to the system may be adjusted based on the disturbance quantity.

After applying the adjusted drive, blocks 306-314 may be repeated. The adjusted drive applied in block 314 may be used as the new input for step 306, and a new adjusted drive may be determined at block 314. Blocks 306-314 may be repeated until instructions are received to transition the system to a third state different from the second state. In some alternative implementations, the one or more processors may determine when the system has reached the second state and end the process of repeating blocks 306-314.

Figure 4:
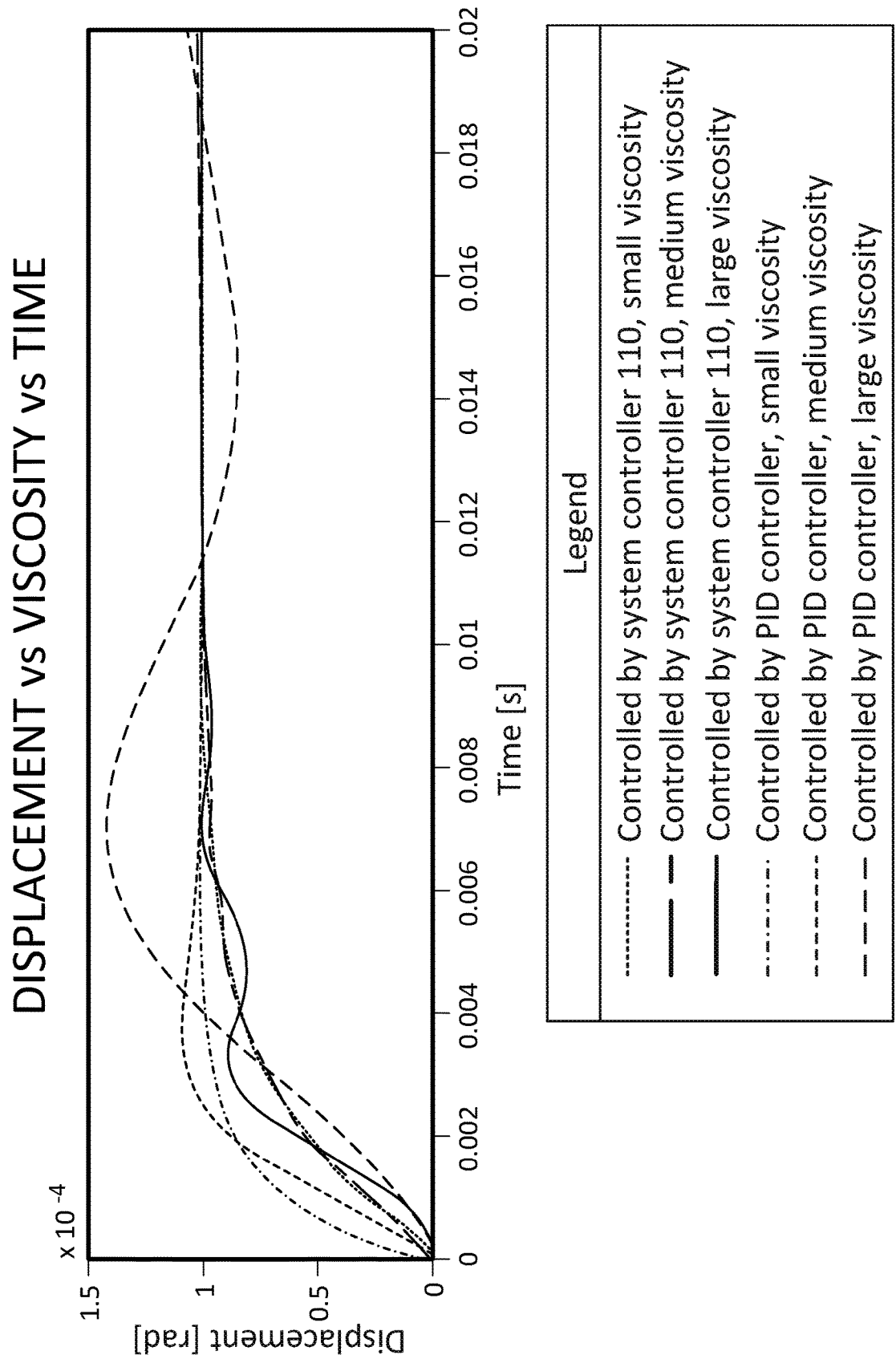
FIG. 4 is a graph 400 of the displacement of a system in accordance with aspects of the disclosure.
Figure 5:
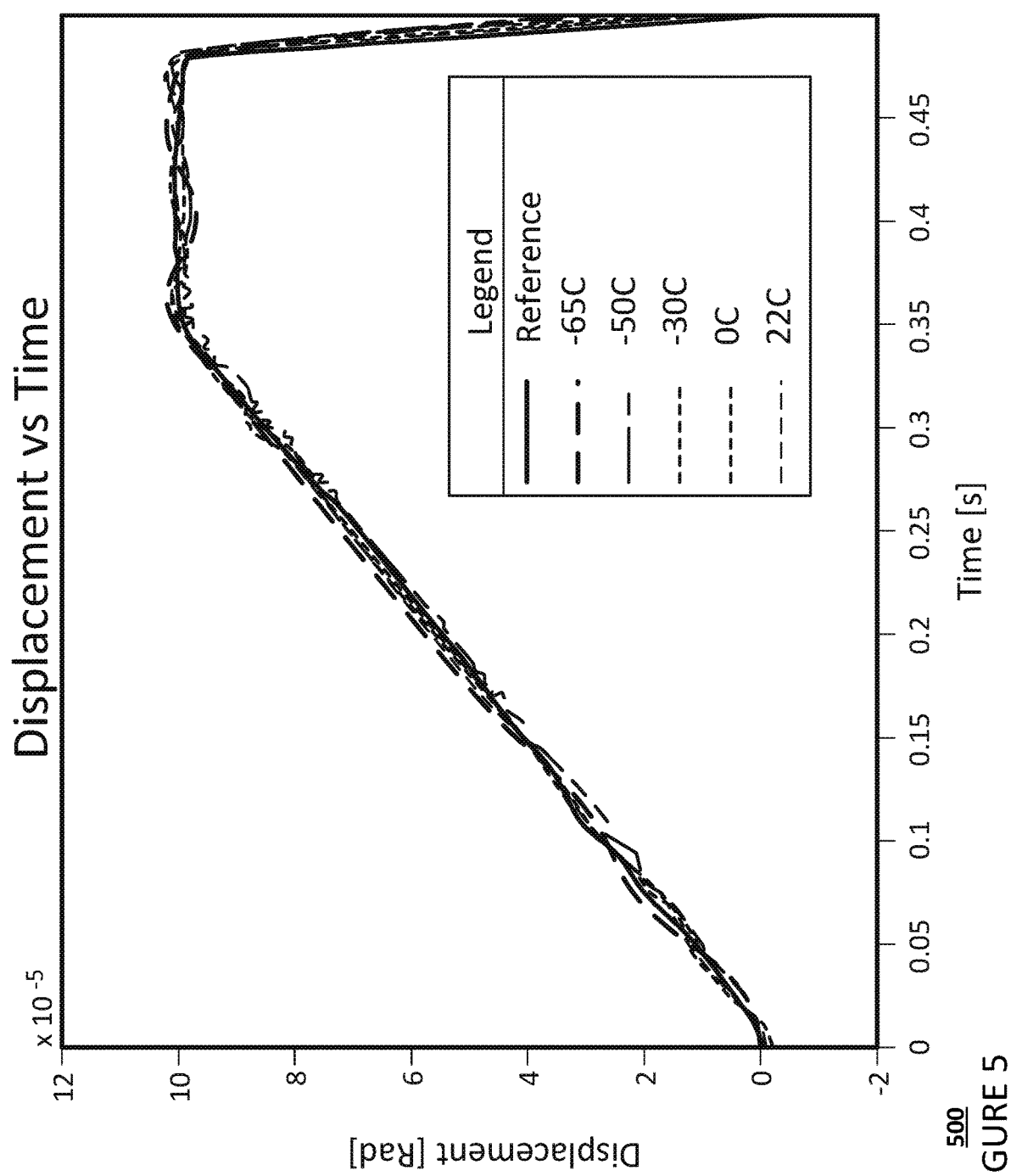
FIG. 5 is another graph 500 of the displacement of a system in accordance with aspects of the disclosure.

As shown in FIGS. 4 and 5, the displacement of a pointing hardware, such as pointing hardware 240, being controlled by the system controller 110 as described above may smoothly translate from one position to the next. In FIG. 4, the first three lines listed in the legend show the rate of displacement of the pointing hardware being controlled by the system controller 110 from a first position to 0.0001 radians away at three different viscosities—small, medium, and large. The large viscosity is 25 times more viscous than the small viscosity. The latter three lines listed in the legend show the displacement of a pointing hardware that is being controlled by a standard proportional-integral-derivative (PID) controller from a first position to 0.0001 radians away at the three different viscosities. As shown in FIG. 4, the first three lines reach a steady state at 0.0001 radians away quicker than the dashed lines.

In FIG. 5, displacement of the pointing hardware being controlled by the system controller 110 as described above is also shown over time. FIG. 5 shows the graph for the displacement from a first position to 0.0001 radians at six different temperatures where the system controller 110 has not calibrated or characterized the system prior to the displacement. As shown, the displacement of the pointing hardware occurs at nearly the same rate for temperatures ranging from −65 degrees Celsius to 22 degrees Celsius. As such, the system controlled by the system controller 110 may be capable of compensating for large ranges in temperatures.

The features described above allows for operating a system in a wider variety of conditions and environments without having to characterize an individual system and with increased performance over the varied conditions since the system model may be updated based on changing conditions. Less manual tuning and/or modification may be required due to the system's ability to adapt to the wider variety of conditions, which may reduce the possibility of error due to incorrect tuning or modification an allow the user to control the system with confidence. A lower drive effort may be needed for operating the system, which may allow for a longer longevity of the system, which users may prefer. Changes in the system may also be smoother and therefore faster. As such, users may have a better experience using the system.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A controller of a system, the controller comprising:
one or more processors in communication with one or more sensors, the one or more processors configured to:
receive instructions to transition the system from a first state to a second state, wherein the first state is a first physical configuration of the system or a first internal characteristic of the system, and the second state is a second physical configuration of the system or a second internal characteristic of the system different from the first state, the difference being measurable by the one or more sensors;

obtain a current state of the system from the one or more sensors, the current state being a current physical configuration of the system or a current internal characteristic of the system;

apply a drive to transition the system from the first state to the second state; and continually adjust the drive in response to a disturbance quantity amount in real-time by performing a loop until the system is in the second state, the loop comprising:

determining a predicted state of the system at a given instance based on the obtained current state of the system, the applied drive, and a model of the system that is based on the obtained current state of the system, known system parameters, and known changes to system parameters under certain conditions, the predicted state being an intermediate physical configuration of the system or an intermediate internal characteristic of the system predicted to occur between the first state and the second state;

obtaining the current state of the system at the given instance using the one or more sensors;

based on a difference between the predicted state at the given instance and an actual state of the system at the given instance, determining the disturbance quantity amount;

determining an adjustment to the drive based on the disturbance quantity amount; and applying the adjusted drive to the system.

2. The controller of claim 1, wherein the system is a communication system comprising a pointing hardware.

3. The controller of claim 2, wherein the first state is a first position of the pointing hardware, the second state is a second position of the pointing hardware different from the first position, the current state is a current position of the pointing hardware, and the predicted state is a predicted position of the pointing hardware at the given instance.

4. The controller of claim 1, wherein the system is a communication system comprising a temperature regulator.

5. The controller of claim 4, wherein the first state is a first temperature of the communication system, the second state is a second temperature of the communication system different from the first temperature, the current state is a current temperature of the communication system, and the predicted state is a predicted temperature of the communication system at the given instance.

6. The controller of claim 1, wherein the model is further based on environmental conditions.

7. A system comprising:

one or more processors in communication with one or more sensors configured to detect a state of a communication system, the one or more processors configured to:

receive instructions to transition the communication system from a first state to a second state, wherein the first state is a first physical configuration of the system or a first internal characteristic of the system, and the second state is a second physical configuration of the system or a second internal characteristic of the system different from the first state, the difference being measurable by the one or more sensors;

obtain a current state of the system from the one or more sensors, the current state being a current physical configuration of the system or a current internal characteristic of the system;

apply a drive to transition the communication system from the first state to the second state; and continually adjust the drive in response to a disturbance quantity amount in real-time by performing a loop until the system is in the second state, the loop comprising:

determining a predicted state of the system at a given instance based on the obtained current state of the system, the applied drive, and a model of the communication system that is based on the obtained current state of the communication system, known system parameters of the communication system, and known changes to system parameters under certain conditions, the predicted state being an intermediate physical configuration of the system or an intermediate internal characteristic of the system predicted to occur between the first state and the second state;

obtaining the current state of the system at the given instance using the one or more sensors;

based on a difference between the predicted state at the given instance and an actual state of the system at the given instance, determining the disturbance quantity amount;

determining an adjustment to the drive based on the disturbance quantity amount; and applying the adjusted drive to the communication system.

8. The system of claim 7, further comprising the communication system.

9. The system of claim 7, further comprising the one or more sensors.

10. The system of claim 9, wherein the one or more sensors includes a thermometer configured to measure a current temperature of the communication system.

11. The system of claim 10, further comprising a temperature regulator, and wherein the first state is a first temperature of the communication system, and the second state is a second temperature of the communication system different from the first temperature.

12. The system of claim 9, wherein the one or more sensors includes an inertial measurement unit.

13. The system of claim 7, further comprising a pointing hardware, and wherein the first state is a first position of the pointing hardware, and the second state is a second position of the pointing hardware different from the first position.

14. The system of claim 7, wherein the one or more processors are configured to:

generate the model of the communication system based on the current state of the communication system, the known system parameters of the communication system, and the known changes to system parameters under certain conditions.

15. The system of claim 14, wherein the model of the communication system is generated further based on environmental conditions.

16. A method comprising:

receiving, by one or more processors, instructions to transition a system from a first state to a second state, wherein the first state is a first physical configuration of the system or a first internal characteristic of the system, and the second state is a second physical configuration of the system or a second internal characteristic of the system different from the first state, the difference being measurable by one or more sensors;

obtaining, by the one or more processors, a current state of the system from the one or more sensors, the current state being a current physical configuration of the system or a current internal characteristic of the system;

applying, by the one or more processors, a drive to transition the system from the first state to the second state; and continually adjusting, by the one or more processors, the drive in response to a disturbance quantity amount in real-time by performing a loop until the system is in the second state, the loop comprising:

determining a predicted state of the system at a given instance based on the obtained current state of the system, the applied drive, and a model of the system that is based on the obtained current state of the system, known system parameters, and known changes to system parameters under certain conditions, the predicted state being an intermediate physical configuration of the system or an intermediate internal characteristic of the system predicted to occur between the first state and the second state;

obtaining the current state of the system at the given instance using the one or more sensors;

based on a difference between the predicted state at the given instance and an actual state of the system at the given instance, determining the disturbance quantity amount;

determining an adjustment to the drive based on the disturbance quantity amount; and applying the adjusted drive to the system.

17. The method of claim 16, wherein the system is a communication system including a pointing hardware, and the first state is a first position of the pointing hardware, and the second state is a second position of the pointing hardware different from the first position.

18. The method of claim 16, wherein the system is a communication system including a temperature regulator, and the first state is a first temperature of the communication system, and the second state is a second temperature of the communication system different from the first temperature.

19. The method of claim 16, further comprising generating the model of the system based on the current state of the system, the known system parameters, and the known changes to system parameters under certain conditions.

* * * * *